Figure 1:
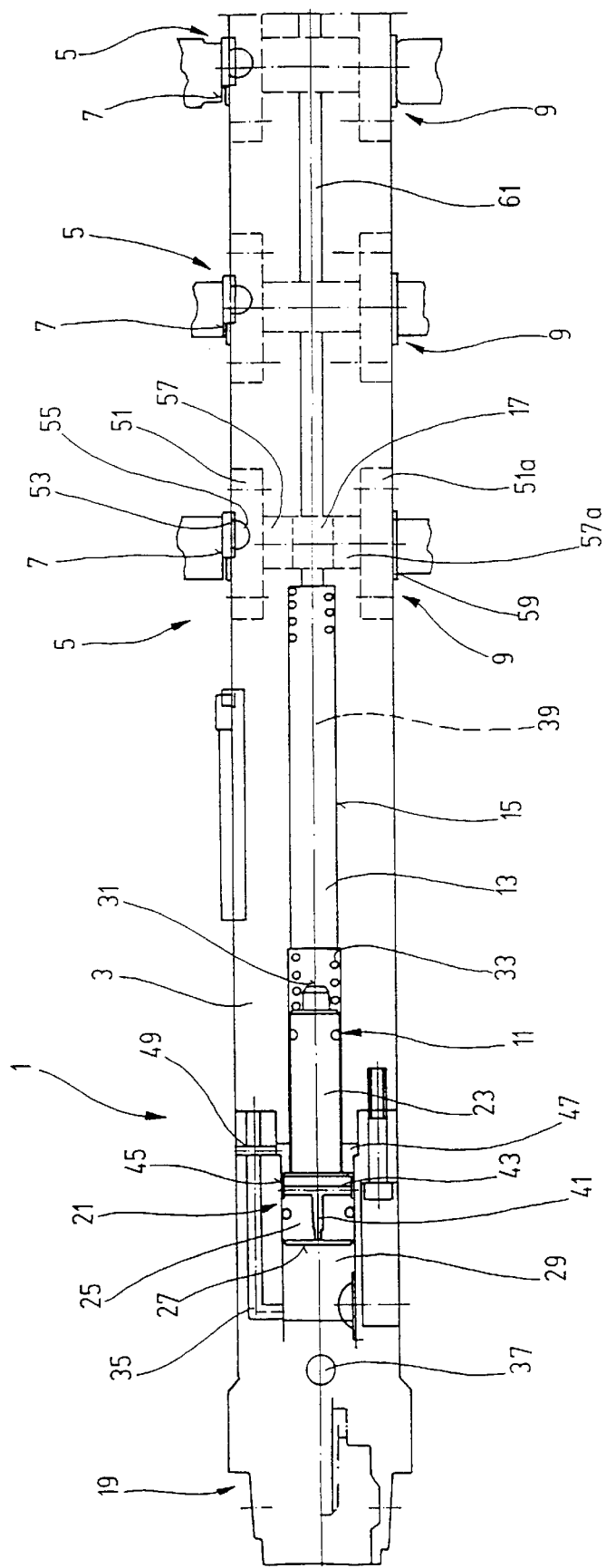

United States Patent
Kress

[19]

[11] Patent Number: 5,865,573
[45] Date of Patent: Feb. 2, 1999

[54] BORING BAR CUTTING AND GRINDING DEVICES

[75] Inventor: Dieter Kress, Aalen, Germany

[73] Assignee: Mapal Fabrik fur Prazisionswerkzeuge, Aalen, Germany

[21] Appl. No.: 739,957

[22] Filed: Oct. 30, 1996

[30] Foreign Application Priority Data

Oct. 30, 1995 [DE] Germany .................. 195 40 374.6

[51] Int. Cl.[6] .................................................. B23B 41/16
[52] U.S. Cl. ................... 408/57; 408/83; 408/147; 408/708
[58] Field of Search ........................ 408/56, 57, 59, 408/83, 147, 708

[56] References Cited

U.S. PATENT DOCUMENTS

| | | | |
|---|---|---|---|
| 1,434,004 | 10/1922 | Greven | 408/708 |
| 2,661,639 | 12/1953 | Clyde | 77/58 |
| 3,300,010 | 1/1967 | Irish | 192/142 |
| 3,389,621 | 6/1968 | Wear | 408/83 |
| 3,526,159 | 9/1970 | Robinson et al. | 408/147 |
| 3,740,161 | 6/1973 | Milewski | 408/158 |
| 3,961,857 | 6/1976 | Koblesky | 408/83 |
| 4,224,846 | 9/1980 | Eysel et al. | 82/36 |
| 4,693,642 | 9/1987 | Mair et al. | 408/59 |
| 4,730,958 | 3/1988 | Banoczky | 408/708 |

FOREIGN PATENT DOCUMENTS

| | | | |
|---|---|---|---|
| 552425 | 7/1993 | European Pat. Off. | |
| 632838 | 7/1936 | Germany | 408/57 |
| 240130 | 9/1964 | Germany | |
| 4121495 | 11/1992 | Germany | |
| 222124 | 7/1968 | U.S.S.R. | 408/147 |
| 437573 | 1/1975 | U.S.S.R. | 408/147 |

Primary Examiner—Steven C. Bishop
Attorney, Agent, or Firm—Ostrolenk, Faber, Gerb & Soffen, LLP

[57] ABSTRACT

A boring bar for machining of borehole surfaces which are arranged axially spaced from each other, in particular crank-shaft and/or cam-shaft bearing holes. The bar has at least one, and preferably a plurality, of cutting devices and at least one, and preferably a plurality of, guide devices each associated with a cutting device. A fluid pressure actuating device acts on both the cutting devices and the guide devices. The actuating device effects a setting movement of each of those devices against a respective defined stop by application of fluid pressure through the boring bar to the cutting devices and the guide devices.

27 Claims, 4 Drawing Sheets

BORING BAR CUTTING AND GRINDING DEVICES

BACKGROUND OF THE INVENTION

The present invention relates to a rotatable boring bar for machining borehole surfaces which are arranged axially spaced from each other, and more particularly relates to the cutting devices on the bar and to the means actuating and the means guiding the cutting devices.

In producing boreholes of the above mentioned type and, in particular, crank-shaft and cam-shaft bearing holes, tools having a cutter are used. The tool is first introduced into the first bearing hole in order to machine its surface. In this connection, in-feed is correspondingly slow. Upon completion of the first bearing hole, the tool is moved forward in an accelerated manner in order to machine the next bearing hole. It has been found that machining time is relatively lengthy due to successive machining of bearing holes which are arranged in a row.

Boring bars have therefore been employed which have several cutters distributed along the length direction of the rotatable boring bar. The cutters are arranged on an imaginary line which extends parallel to the central axis of the boring bar. In order to introduce the boring bar into the workpiece to be machined, for instance an engine block, the workpiece is lifted. When all cutters are arranged directly in front of the bearing hole surface to be machined, the engine block is lowered again. After the borehole surfaces have been machined, the engine block must be lifted again so that the boring bar can be moved out of the workpiece without injuring the surface of the borehole. This manner of machining is relatively expensive. Furthermore, the displacement of the engine block causes inaccuracies upon machining of the borehole surfaces.

SUMMARY OF THE INVENTION

The object of the present invention is therefore to provide a boring bar with which boreholes of the type in question here can be machined in simple manner.

In order to achieve this object, a boring bar is proposed for machining of borehole surfaces which are arranged axially spaced from each other, in particular crank-shaft and/or cam-shaft bearing holes. The bar has at least one and preferably a plurality, of cutting devices and at least one and preferably a plurality of, guide devices each associated with a cutting device. A fluid pressure actuating device acts on both the cutting devices and the guide devices. The actuating device effects a setting movement of each of those devices against a respective defined stop by application of fluid pressure through the boring bar to the cutting devices and the guide devices. Because the cutting device of the boring bar is movable by means of an actuating device, the boring bar can be passed, with the cutting device in a retracted or rest position, through the boreholes of the bearings to be machined even if those holes have a certain oversize and thus a smaller inside diameter than after the machining. The cutting device can therefore be moved backward or inward in order to be able to bring the boring bar into the workpiece. The cutting device is extended into an operating position by means of the actuating device for machining the surface of the borehole. In order to maintain the desired boring properties, and therefore both the dimension and the quality of the surface, the cutting device is moved by the actuating device outward of the bar and against a defined stop. This assures that the desired amount of machining is maintained.

A preferred embodiment of the boring bar includes a guide ledge around the boring bar from the cutting device.

The guide ledge can also be moved by means of the actuating device from a radially withdrawn position into an extended operating position. A smaller outside diameter of the boring bar is obtained and thus a larger clearance is obtained so that the boring bar can easily be introduced into the workpiece which is to be machined.

In a particularly preferred embodiment of the boring bar, the actuating device jointly displaces both a cutting device and a corresponding guide ledge. The boring bar can in this way be produced easily and inexpensively.

In a further preferred embodiment of the boring bar, the actuating device is hydraulic and coolant is used as the operating fluid. In this case, therefore, no additional means is required in order to actuate the actuating device.

Other features and advantages of the present invention will become apparent from the following description of the invention which refers to the accompanying drawings.

BRIEF DESCRIPTION OF THE DRAWINGS

FIG. 1 is a diagrammatic side view partially in section of the rear end of a boring bar;

FIG. 2 is a diagrammatic partially sectional side view of the other end of a boring bar;

FIG. 3 is a cross-section along the line III—III of FIG. 2; and

FIG. 4 is a cross section through another embodiment of a boring bar.

DETAILED DESCRIPTION OF THE INVENTION

Boring bars of the type disclosed here are generally suited for machining borehole surfaces which are arranged spaced from each other along the axial direction of the workpiece. For example, it is assumed below that bearing-hole surfaces of crank-shafts and/or cam shafts are to be machined by means of the boring bar. Other workpieces may be bored, as well.

In FIG. 1, the boring bar 1 has a substantially cylindrical main body 3. Several cutting devices 5 are distributed over the length of the body 3. However, a boring bar of the type discussed here may also have as few as only a single cutting device.

The cutting devices 5 are spaced predetermined distances apart along the axial direction of the boring bar 1 which corresponds to the distance apart of the respective bearing holes 7 for those devices in the boring bar, which holes are merely indicated here. Respective guide means 9 are associated with the cutting devices 5. In the embodiment shown here, a guide device 9 is diametrically opposite each cutting device 5 around the boring bar.

An actuating device 11 enables the cutting devices 5 and the guide devices 9 to be displaced. The actuating device 11 has a closed space 13 which is arranged inside the body 3. That space is filled with a liquid or gaseous fluid. Filling that space 13 with hydraulic oil is preferred. The closed space 13 is defined by an axially extending borehole 15 which passes through the body 3. The borehole 15 is in fluid communication with transverse holes 17 which are arranged in the axial regions along the boring bar of the cutting devices 5 and the guide devices 9.

The closed space 13 is closed by a piston 21 at its one end, here facing the drive side 19 of the boring bar 1. The piston acts as a pressure intensifying device. The piston 21 has a first section 23 with a diameter adapted to the inside diameter of the closed space 13. Further, the piston 21 has a second section 25 with an outside diameter that is greater than that of the first section 23. The end 27 of the section 25 serves as a closure for an actuating space 29. The cross-sectional area of the end 27 is about twice as great in the embodiment shown here as the area of the end surface 31 of the first section 23 facing the space 13.

The piston 21 is acted on by a restoring force toward the left in FIG. 1 supplied by a restoring member 33. The restoring member 33 can be developed, for instance, as a coil spring which acts on the piston 21.

The actuating space 29 is acted on here by coolant which is fed through suitable channels 35 and is also fed to the cutting and guide devices 5, 9. A non-return valve 37 prevents the flow of the coolant out of the actuating space 29 during a change of the tool. Any air which has penetrated into the actuating space 29 during a change of the tool can escape via radial holes which open into the actuating space 29. The channels 35 are developed so that air can emerge through them when the tool is at rest.

Upon operation of the tool, air which has penetrated into the actuating space 29 accumulates in the vicinity of the axis of rotation 39, due to the centrifugal force acting on the coolant. In order to allow the air to emerge from the actuating space 29, the piston 21 has a central hole 41 in the region of its second section which permits air to emerge via at least one transverse channel 43.

For this purpose, the transverse channel 43 opens into an annular groove 45 in the outer surface of the piston 21 and that groove is in fluid communication with a space 47 from which the air can escape.

A radially extending control hole 49 opens into the space 47. A control pin, not shown, can be introduced into the hole 49. The control hole 49 is arranged so that the control pin is displaced radially outward by the piston 21 when the piston 21 is displaced to the right against the force of the restoring member 33 beyond the normal path of actuation. Therefore, if hydraulic oil emerges from the closed space 13, the piston 21 of the actuating device 11 can be pushed far to the right against the force of the restoring member 33 so that the control pin becomes visible to the operator enabling a loss of liquid to be recognized.

The cutting device 5 has a support member 51 which is depressed into the body 3 of the boring bar 1. The support member 51 preferably has a generally rectangular shape. The longitudinal axis of the support member 51 extends in the direction of the axis of rotation 39. A cutting plate 53 is arranged on the support member 51. An ordinary clamping claw 55 anchors the support member 51. For longer cutting plates, more than one clamping claw can also be arranged alongside each other.

A cylindrical extension 57 extends radially inward a short distance from the substantially rectangular support member 51 and is guided in the transverse borehole 17. Suitable sealing means can be used here, for instance, one or more round packing rings which seal-off the cylindrical extension 57 from the transverse hole 17 in such a manner that no hydraulic fluid can flow out of the closed space 13.

The guide device 9 has a corresponding construction. It has a support member 51a which also may have a generally rectangular shape. Its longitudinal axis extends in the direction of the axis of rotation 39. A guide ledge 59 is inserted in the outer surface of the support member 51a. It is also possible to provide more than one guide ledge. A cylindrical extension 57a extends from the support member 53 in the transverse borehole 17. The transverse borehole 17 is in fluid communication with the closed space 13 so that both the cutting device 5 and the guide device 9 are movable like slides in the radial direction of the body 3 of the boring bar 1 by movement of the actuating device 11.

The cutting device 5 and/or the guide device 9 may have a return element which acts on the cutting device 5 or the guide device 9 with a radially inwardly acting restoring force so that the two slides are displaced radially inward upon a release of pressure in the closed space 13.

Figure 2:
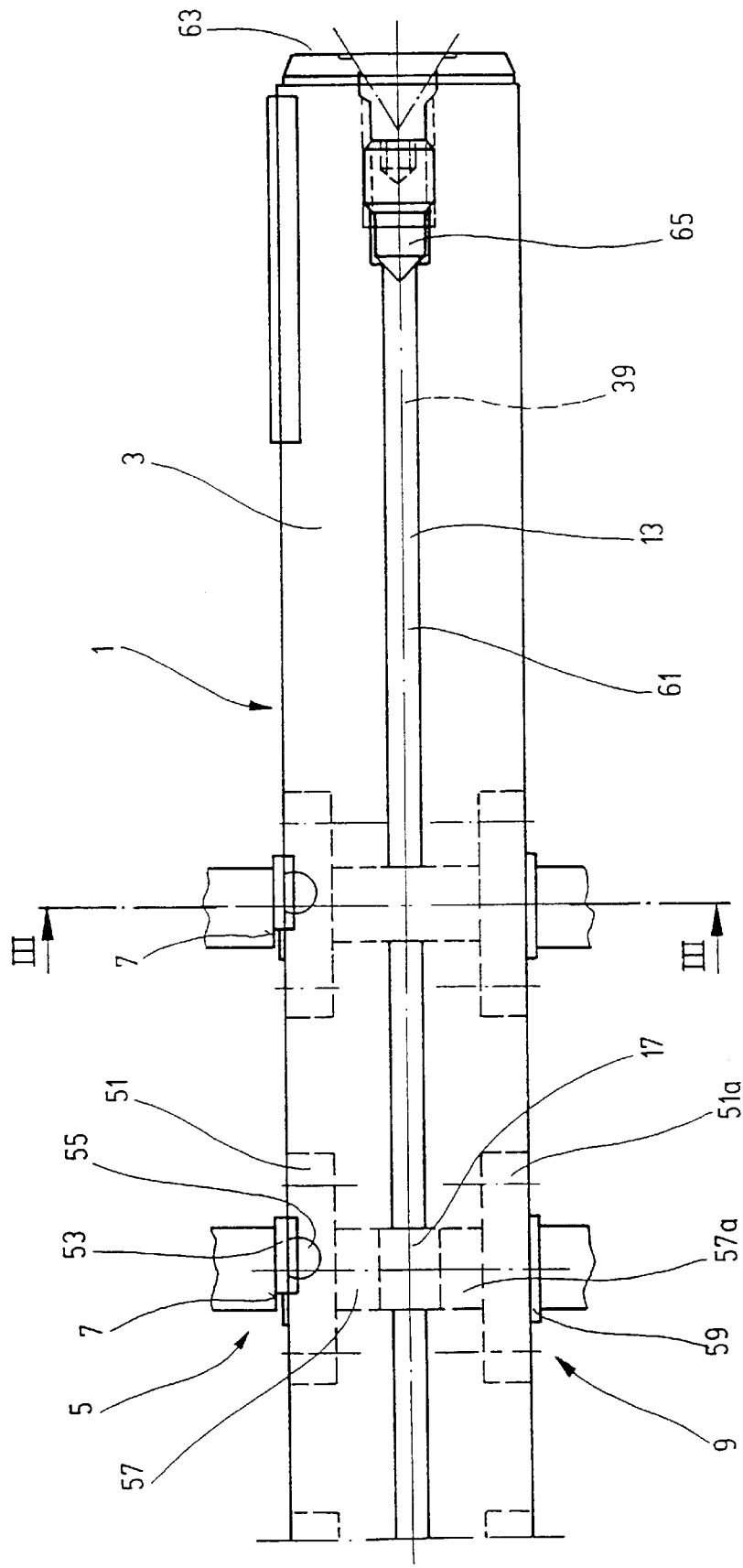

FIG. 2 shows the front part of the boring bar 1 shown in FIG. 1. As the same parts are provided with the same reference numerals, no repeat detailed descriptions of parts are provided. The closed space 13 has a longitudinal borehole 61 which passes through the main body 3 of the boring bar 1 and extends up to the front or leading end 63 of the boring bar 1. The region of the front mouth of the lengthwise borehole 61 is closed by a suitable closure member 65, for instance by a screw, which permits the closed space 13 to be filled with hydraulic oil. In this case, the screw is arranged approximately concentrically to the axis of rotation 39. The space 13 or the longitudinal borehole 61 may be filled through a transverse borehole.

Figure 3:
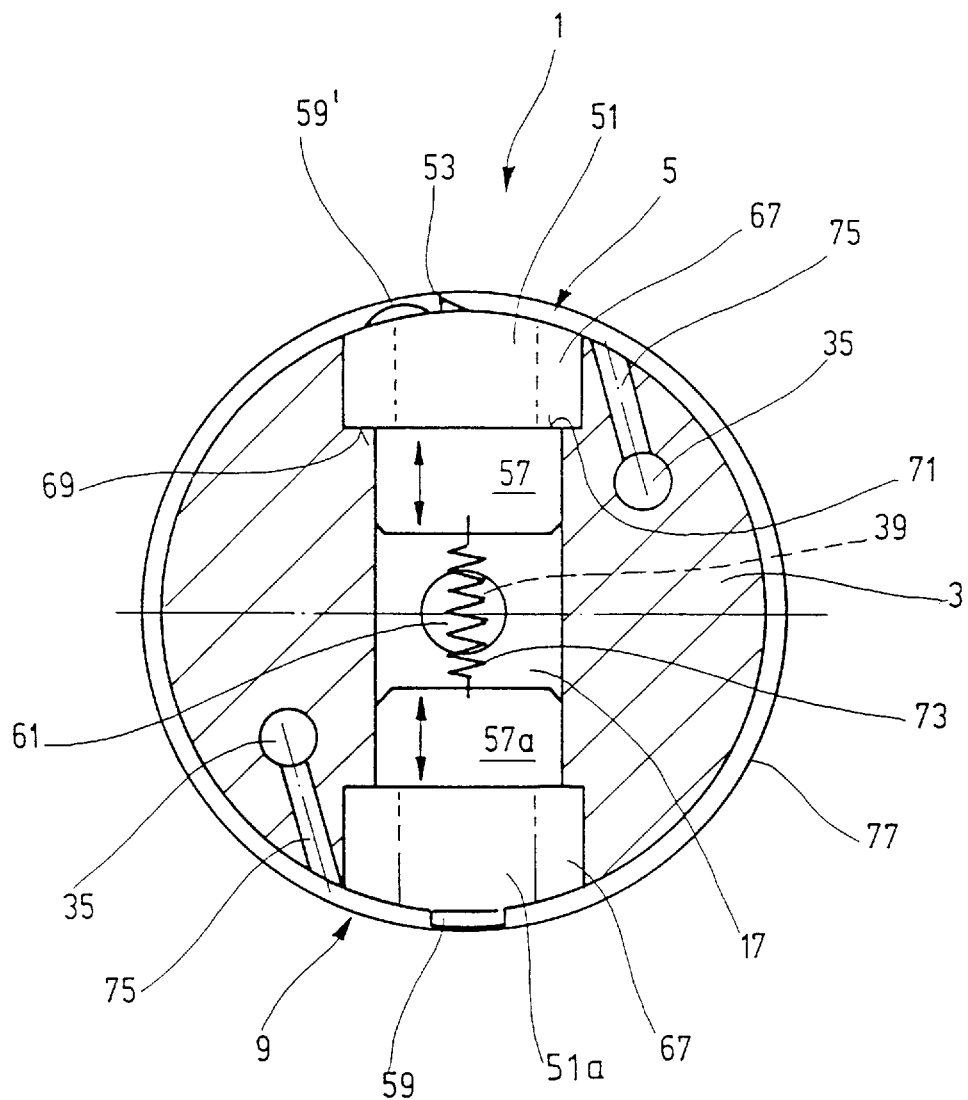

FIG. 3 clearly shows two slides respectively of the cutting device 5 and the guide device 9. The sectional view also shows guide elements 67 in the region of the transverse borehole 17 having a transverse dimension which is greater than the diameter of the transverse borehole 17. A dashed line indicates that the support member 51 of the cutting device 5 and the support member 51a of the guide device 9 are narrower than the cylindrical extensions 57 and 57a respectively. The guide elements 67 have recesses which are adapted to the outer shape of the support members 51, 51a to guide the support members and hold them in alignment. The bottom sides 69 of the guide elements 67 which face the axis of rotation 39 serve as stops for the top sides 71 of the cylindrical extensions 57 and 57a.

The axial borehole 61 opens in the transverse borehole 17, as can be noted in FIG. 3.

The restoring elements 73 bring the slides back into their radially inner position. The elements 73 can be developed as coil springs which exert pulling forces on the slides or on the cutting device 5 and guide device 9. The restoring elements 73 are designed to pull the slides into their radially inner position when the space 13 is without pressure. In FIG. 3, the slides are in their outermost position against the stop formed by the bottom side 69 and thus also in their machining position. FIG. 3 shows that the channels pass through the body 3 of the boring bar 1 in the longitudinal direction and that feed holes 75 are provided which intercept the channels 35. The cooling and/or lubricating agent can emerge through the channels into the operating region of the cutting plate or the guide ledge 59.

The surface of the bearing hole which is to be machined is indicated by a line 77.

Figure 4:
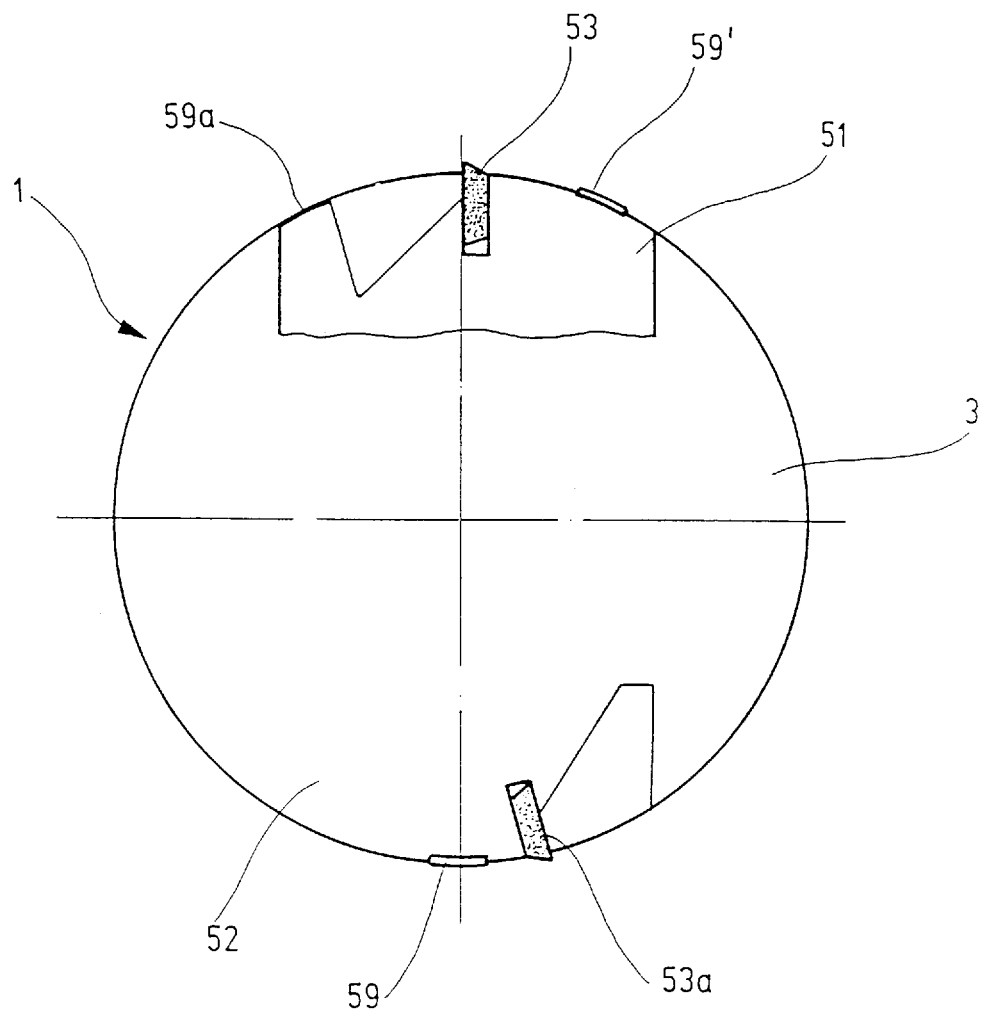

The schematic FIG. 4, a cross section through a boring bar, shows that the slides can be developed so that they have both a cutting plate and a guide ledge. In FIG. 3 and in FIG. 4 a cutting plate 53 is in the upper slide 51 with which a diametrically opposite guide ledge 59 is associated in the lower slide 52. The lower slide 52 furthermore has a cutting plate 53a with which there is associated a diametrically opposite guide ledge 59a in the upper slide 51.

FIG. 4 shows that another guide ledge 59' can be provided on the upper slide 51. The ledge 59' is also associated with the guide ledge 59 of the cutting plate 53. The guide ledge 59' can also be provided even when the cutting plate 53a and guide ledge 59a are not present. Therefore, the ledge 59' can also be present in an embodiment like FIG. 3.

The knife plates and guide ledges are fastened in known manner in the slides and guide devices respectively so that this need not be described further.

The functioning of the boring bar 1 is now described.

The actuating device 11 shown in FIG. 1 is controlled via the coolant which can pass via the non-return valve 37 into the actuating space 29. From there, it passes via the channels 35 to the cutting plates 53 and guide ledges 59. If the pressure in the actuating space 29 increases, then the piston 21 is displaced toward the right in FIG. 1 against the force of the restoring member 33 developed as coil spring, and this increases pressure in the closed space 13. Since the space 13 is in hydraulic communication with the transverse boreholes 17, the pressure in those holes also increases.

At a predetermined pressure, the slides, i.e. the cutting devices 5 and the guide devices 9, are displaced radially outward in FIG. 3 against the force of the respective restoring elements 73, until they contact the bottom sides 69, serving as stop, of the guide elements 67. A build-up of pressure in the space 13 displaces both the cutting devices and the guide devices into a defined working position, making dimensionally correct machining of the surfaces of the bearing holes possible.

To introduce the boring bar 1 into a workpiece which is to be machined, the pressure in the actuating space 29 is decreased. The piston 21 is shifted towards the left by the force of the restoring member 33, so that the pressure in the space 13 is decreased and even a vacuum is possibly produced. This displaces the slides or cutting/guide devices 5, 9 radially inward. This inward movement is supported by the restoring elements 73. It is possible to omit the restoring member 33 and, by the positive return of the slides by means of the restoring element 73, to maintain pressure in the space 13 even if no coolant pressure prevails in the actuating space 29. The pressure built-up by the restoring elements 73 can move the piston 29 into its starting position.

In this embodiment, the guide devices 9 are arranged opposite the cutting devices 5. This optimally intercepts the forces introduced into the cutting plates 53. It is possible to equip the guide devices 9 with more than one guide ledge 59. It is also possible to associate several cutters and/or guide ledges with each of the slides.

In FIG. 1, the cutting and guide devices 5 and 9 lie along an imaginary line parallel to the axis of rotation 39. However, it is possible to arrange adjacent cutting devices at circumferentially shifted orientations with respect to each other in order to distribute the forces introduced into the tool upon the machining of bearing holes as uniformly as possible.

Finally, it is also possible to machine bearing holes of different diameters. In the retracted position, the cutting and guide devices can be introduced into the boreholes. Upon pressurizing of the space 13, the cutting devices with the guide devices are moved together against the stop, producing a defined operating position. Selection of the stop and corresponding adjustment of the cutting plates 53 enable different machining diameters to be selected.

Furthermore, the boring bar may also be developed with additional guide ledges which are arranged, for instance, opposite each other. These guide ledges can be extracted by the actuating device to assure an optimal support of the cutters. In other words, the boring bar can have a cutter with corresponding guide ledge or can have separately movable guide ledges. The additional guide ledges provide improved support of the boring bar. Such a development of the boring bar enables machining bearing holes of a given diameter and also enables supporting the tool in another borehole of larger or smaller diameter by means of the additional movable guide ledges. In all cases, the additional support of the tool enables the dimensional accuracy of the borehole surfaces being machined and their quality to be particularly high.

The piston 21 has two sections 23 and 25 of different size outside diameters. The outside diameter of the second section 25 is greater than that of the first section 23. The pressure prevailing in the actuating space 29 is stepped-up by the ratio of the surfaces of the sections 23 and 25 so that a higher pressure prevails in the space 13 than in the actuating space 29. In the embodiment shown, pressures prevailing in the actuating space 29 can be practically doubled in the space 13 so that the slides are moved outward with high force and are then held in their operating position.

All slides and the transverse boreholes 17 associated with the slides are connected via a single longitudinal borehole 61. It is possible to use different longitudinal boreholes each associated with different respective transverse boreholes 17. It is thus possible to control the slides individually by separate pistons. However, the cutting plates are preferably moved together with the guide ledges so that well-defined operating conditions can be established.

The guide elements can also be arranged staggered with respect to the cutting elements. In that case, it is preferable to associate separate restoring elements 73 with the cutting elements. In the arrangement in FIGS. 1 to 3, the cutting and guide elements can be provided with a common restoring element 73 which acts at the same time on both sides.

Basically, the coolant can also act directly on the slides. In that case, the operating pressure necessary for displacement of the slides would have to be applied by the coolant. Furthermore, those impurities, which can practically never be avoided in the coolant, can pass into the region of the cylindrical extensions of the slides and impair their mobility. For this reason, the embodiment shown here is preferred, because it includes a separate hydraulic system that is acted on via a closed space 13 with a hydraulic fluid, which is associated with the guide or cutting and guide devices. This hydraulic fluid does not come into contact with the coolant, so that impurities cannot impair the mobility of the slides.

The tool shown excellently machines boreholes which are spaced apart in the axial direction. Because guide ledges associated with the cutting plates are arranged movably, optimal working conditions prevail in the machining region, i.e. the tool is supported in such a manner by the guide ledges that support points for the boring bar within the workpiece to be machined can frequently also be dispensed with.

Since the cutting plates and the guide ledges can be shifted back or into the boring bar upon the introduction of the boring rod, displacement of the workpiece is not required in order to bring the boring bar into its operating position. Even during outward extraction of the boring bar, the workpiece can remain in its operating position since the machined borehole surfaces can no longer be damaged by the return of the slides or of the cutting and guide devices.

For the boring bar 1 described here, it is essential that the actuating device 11 act directly on the cutting devices 5 or the guide devices 9. This means that no mechanical setting members need be interposed in order to move the slides of the cutting or guide devices. Thus the construction of the boring bar is very simple and compact. Furthermore, its operation is very insensitive to disturbance. Since the cutting devices are moved against a stop by the actuating device, precisely definable operating conditions result even without mechanical setting means, so that the borehole surfaces machined are dimensionally very precise and furthermore are of excellent surface quality.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A boring bar for machining borehole surfaces, the boring bar comprising:

a main body;

at least one cutting device supported on the main body to machine a borehole surface;

a guide device supported on the main body and associated with the cutting device to be actuated to guide the boring bar and the cutting device during machining of the borehole surface;

an actuating device acting on the cutting device to urge the cutting device toward a cutting position at the borehole surface, the actuating device being connected to act on the guide device to urge the guide device outward toward the borehole surface, the actuating device for the cutting device and for the guide device is a common actuating device;

a stop in the main body for the cutting device to set movement of the cutting device toward the borehole surface which movement is caused by the actuating device; and a second stop to set movement of the guide device outward toward the borehole surface, and the actuating device being connected with the guide device to move the guide device against the second stop.

2. The boring bar of claim 1, further comprising a first plurality of the cutting devices and a second plurality of the guide devices arrayed along the length of the boring bar.

3. The boring bar of claim 2, wherein the actuating device is a common actuating device for all of the cutting devices and all of the guide devices.

4. The boring bar of claim 2, further comprising a restoring element for each of the cutting devices and for each of the guide devices for restoring the cutting devices and the guide devices opposite the directions they are urged by the actuating device.

5. The boring bar of claim 4, wherein a respective one of the cutting devices and a respective one of the guide devices are connected to each other by a common respective one of the restoring elements.

6. The boring bar of claim 1, wherein the actuating device provides fluid under pressure for acting on the cutting device and on the guide device.

7. The boring bar of claim 6, wherein the fluid is a gaseous medium.

8. The boring bar of claim 6, wherein the fluid is a liquid fluid medium.

9. The boring bar of claim 6, wherein the actuating device includes a closed space within the boring bar body within which the fluid is contained.

10. The boring bar of claim 9, further comprising a pressure intensifying device at the closed space for selectively increasing the pressure in the closed space.

11. The boring bar of claim 10, wherein the pressure intensifying device comprises a piston shiftable at the closed space in the boring bar for intensifying the pressure in the closed space.

12. The boring bar of claim 11, wherein the piston has first and second active surfaces, the first surface being in the closed space and having a smaller surface area, the second surface facing out of the closed space and having a larger surface area; and means communicating an operating fluid against the second surface of the piston for operating the actuating device piston to intensify the pressure in the closed space.

13. The boring bar of claim 12 wherein the first surface and the second surface face in opposite directions.

14. The boring bar of claim 11, further comprising a coolant lubricant feed to the cutting device and the guide device, and the coolant lubricant feed being connected with the actuating device for operating the actuating device.

15. The boring bar of claim 6, further comprising a coolant lubricant feed to the cutting device and the guide device, and the coolant lubricant feed being connected with the actuating device for operating the actuating device.

16. The boring bar of claim 1, wherein each cutting device has a cutting plate and each guide device has a respective guide ledge.

17. The boring bar of claim 16, wherein the cutting device includes a support member at the main body and a cutting plate supported on the support member and facing out toward the borehole surface.

18. The boring bar of claim 17, further comprising, a second support member at the main body;

the guide device comprising a guide ledge on the second support member for being disposed in the borehole for guiding the cutting device.

19. The boring bar of claim 17, further comprising an extension on the cutting device extending into the main body and away from the cutting plate of the cutting device, the extension being the part of the cutting device that engages the stop for determining the extent to which the cutting plate projects toward the borehole surface.

20. The boring bar of claim 18, further comprising a guide element at the cutting device for guiding the movement of the cutting device toward the borehole surface.

21. The boring bar of claim 17, further comprising a guide element at the cutting device for guiding the movement of the cutting device toward the borehole surface.

22. The boring bar of claim 21, further comprising a second guide element at the guide device for guiding the position of the guide device with reference to the borehole surface.

23. The boring bar of claim 22, wherein the cutting device and the guide device have respective first stop sides thereof located in the main body and the first and second guide elements have respective opposing second stop sides also in the main body, such that engagement between the first and the second stop sides establishes the extent to which the cutting element and guide element are urged out of the cutting device by the actuating device.

24. The boring bar of claim 18, wherein a respective one of the cutting devices and of the guide devices are shaped and positioned so that a respective cutting plate and a respective guide ledge are generally diametrically opposite around the main body.

25. The boring bar of claim 2, wherein the cutting devices of the plurality are arranged along an imaginary line extending in the axial direction along the boring bar.

26. The boring bar of claim 2, wherein the cutting devices are arranged staggered with respect to each other around the boring bar at locations along the boring bar.

27. The boring bar of claim 1, wherein the actuating device uses fluid pressure for acting on the cutting device.

* * * * *